Oct. 28, 1969    T. H. BENZINGER    3,474,790
HUMIDITY ACTUATED TEMPERATURE CONTROL SYSTEM
Filed Sept. 27, 1965
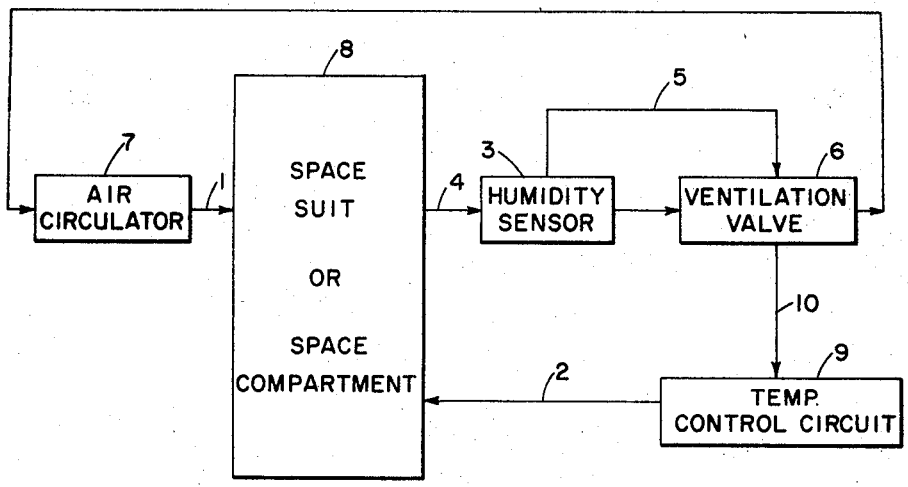
Fig. 1
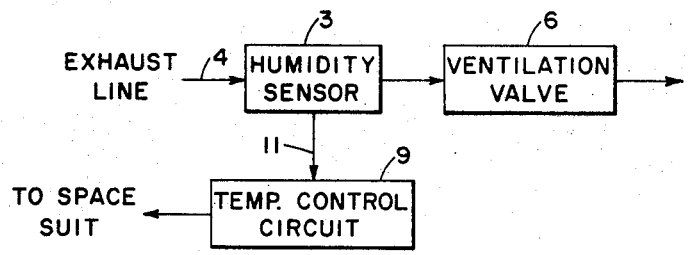
Fig. 2
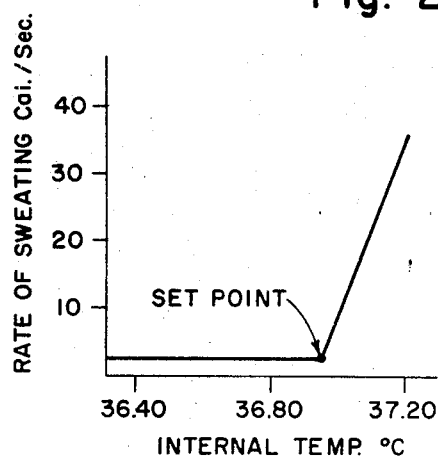
Fig. 3
INVENTOR.
Theodor H. Benzinger
BY 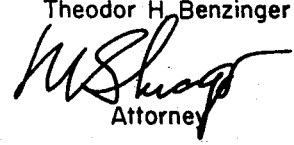
Attorney

3,474,790
HUMIDITY ACTUATED TEMPERATURE CONTROL SYSTEM
Theodor H. Benzinger, Chevy Chase, Md., assignor to the United States of America as represented by the Secretary of the Navy
Filed Sept. 27, 1965, Ser. No. 490,749
Int. Cl. A61f 7/00; F24f 3/14
U.S. Cl. 128—402                  4 Claims

ABSTRACT OF THE DISCLOSURE

This invention covers an arrangement for regulating the internal body temperature of an individual so as to maintain this temperature at a level corresponding to optimum physiological performance. The control mechanism employed is the change in the individual's incipient sweating rate caused by the internal hypothalamus reacting to changes in internal body temperature. This sweating rate is monitored and employed in a control system which maintains the humidity level of an enclosure constant and changes the temperature level therein to restore the internal body temperature to its proper level whenever it departs therefrom.

---

The disclosure described herein may be manufactured and used by or for the Government of the United States of America for governmental purposes without the payment of any royalties thereon or therefor.

The present invention relates generally to apparatus for and methods of maintaining the temperature of the human body at a level corresponding to that at which optimum physiological performance is realized.

Conventional methods of regulating the temperature of the human body usually employ external temperature sensors as their control circuit actuators and, consequently, they endeavor to maintain the temperature of the body constant by keeping the temperature of the environment constant. Hence, the environment really, and not the interior, of the body is thermoregulated. This type of indirect regulation does not respond, for example, to changes of internal temperature originating from internal heat production in the body. To achieve this type of control, temperature sensors could be inserted directly into the body. However, this is an inconvenient solution. Also, rectal and oral positions of such thermometers may give unsatisfactory results since the temperature in these locations may deviate widely from the temperature of the "human thermostat" in the brain which is the site which should be ideally controlled.

The physiologic mechanisms controlling body temperature in man have recently become known in reproducible and quantitative terms of causes and effects, stimuli and responses. These findings make it possible to design an artificial control loop in which a physiological sensor unconsciously and unwillingly cooperates with external devices to regulate the temperature of the human body. Thus, a half natural, half artificial system can be devised.

In applicant's U.S. Patent No. 3,054,397, there is set forth a brief discussion of the thermoregulatory function of the hypothalamus, an area at the base of the brain stem just above the crossing of the optic nerves. In the biological servomechanism system that prevents overheating of the body in a hot environment, the hypothalamus performs as the sensory-receptor organ. It registers the physical quantity that is to be regulated, namely, the internal body temperature, and generates nerve impulses commensurate with the magnitude of this stimulus. The effector organs that act in response to these impulses to maintain the body temperature steady, despite warm environmental changes, are the cutaneous sweat glands and the peripheral blood vessels.

The absence of thermoregulatory warm impulses from the skin to this heat control center is reported in applicant's publication appearing in the April 1961 issue of the "Annals of Internal Medicine," Vol. 54, No. 4, entitled, "The Quantitative Mechanism and the Sensory-Receptor Organ of Human Temperature Control in Warm Environments." In one reported test, the subject was exposed to drastic differences in skin temperature. But no meaningful relationship was observed between this temperature and the rate of sweating, the plot of the subject's heat dissipation by sweating versus skin temperature yielding a senseless graph. However, when the same measurements of sweating were plotted against internal head temperature, as measured at the tympanic site, an inseparable and reproducible relationship appeared. The curve exhibited a sharply defined change of slope at 36.9° C. This point of departure may be thought of as the "set point" of the human thermostat in the particular subject at the time of the experiment. A mere 0.01° C. rise in temperature from this breakoff point was sufficient to increase the dissipation of heat through sweating by one calorie per second and to raise the blood flow through the skin by 15 milliliters per minute.

Instead of directly sensing the internal cranial temperature by, for example, inserting a clinical ear thermometer of the type disclosed in applicant's U.S. Patent No. 3,156,117 into the auditory canal with its thermoelectric junction in contact with the tympanic membrane and utilizing this sensor in the temperature control system, the present invention circumvents any need of applying such a temperature sensor to the human body by making use of the above relationship. The essential step in the present method is the utilization of response by the internal hypothalamus as this organ reacts to changes of the internal body temperature from the above set point by causing sweating. Stated somewhat differently, the sensor of the present system actually measures or indicates the rate of human water loss through sweating and, in utilizing this sweating action, it takes advantage of the physiological connection between the physical response and the central temperature of the human body.

It is accordingly a primary object of the present invention to provide a new system for maintaining the temperature of the human body near the level of optimum physiological performance.

Another object of the present invention is to provide a temperature control system for the human body which utilizes a phyosiologic sensor as part of the system instead of a temperature-responsive device.

A still further object of the present invention is to provide a half-natural, half-artificial control circuit for regulating body temperature.

A yet still further object of the present invention is to provide a temperature control system for the human body which is keyed to the internal cranial temperature and does not require a temperature sensor in the body.

A yet still further object of the present invention is to provide a system for controlling temperature of the human body wherein the sensor responds to impulses from hypothalamus as manifested by incipient sweating.

A yet still further object of the present invention is to provide an artificial cooling circuit for the human body which restores and maintains the normalcy of the body temperature without physiologic effector mechanism, sweating, and without a man-made sensor for the temperature in the human body.

Other objects, advantages and novel features of the invention will become apparent from the following detailed description of the invention when considered in conjunction with the accompanying drawings wherein:

FIG. 1 illustrates a system embodying the present invention which can be employed to regulate the temperature of an individual wearing a pressure suit;

FIG. 2 shows an alternative arrangement; and

FIG. 3 is a typical plot of internal temperature versus rate of sweating with the location of the set point marked.

To regulate the temperature of an individual wearing a pressure suit, for example, or otherwise confined in a restricted space, a combined natural and artificial control system of the type illustrated in FIG. 1 may be utilized. This embodiment of the invention consists of a ventilation circuit 1 which circulates air or an air-oxygen mixture through the enclosed space in an open or closed system and a complementary temperature control circuit 2 which either heats or cools this space. Both of these circuits are under the control of a humidity sensor 3 which is positioned in the exhaust line 4 of the ventilation circuit. This sensor may take the form of the apparatus disclosed in U.S. Patent 3,139,085 of June 30, 1964.

Humidity sensor 3 is connected through a suitable control link 5 to a ventilation valve 6 which regulates the amount of air flowing in the ventilation circuit. In the present case, sensor 3 continuously controls this valve so as to maintain a constant humidity level within space 8.

Ventilation valve 6 is also interconnected through a control link 10 to a valve 9 in the temperature control circuit 2. In this respect, whenever valve 6 is, for example, further opened from a given position to increase the amount of air circulating through ventilation circuit 1, valve 9 is set to increase the amount of cooling fluid circulating within temperature control circuit 2. Likewise, whenever valve 6 is moved toward a closed condition to decrease the amount of air circulating through ventilation circuit 1, valve 9 is set to either reduce the amount of cooling fluid circulating within temperature control circuit 2 or permit a proper amount of heating fluid to flow through this same circuit.

A cycle of operation of the above system induced by a transient rise in the individual's metabolic heat production starts with a corresponding increase in his central temperature above his "set point," as shown in FIG. 3, which is a plot of internal temperature versus rate of sweating. The human thermostat, the hypothalamus, responds to this increase by raising his rate of sweating. Humidity sensor 3 detects this increase and activates ventilation valve 6, further opening this valve and allowing air circulator 7 to circulate a greater amount of air through the system. As a result of this increased level of ventilation, the humidity within the interior of space 8 drops back to normal.

The deviated position of ventilation valve 6 responsible for the aforementioned increase in air flow now establishes through link 10 a new setting for temperature control valve 9. This setting is such that a greater amount of cooling liquid now circulates through temperature control circuit 2. This reduces the temperature within space 8 and acts to counterbalance the incremental increase in the individual's internal temperature. Consequently, his temperature drops back towards its proper level and so does his sweating rate. The humidity level within space 8 and at sensor 3 decreases, reflecting this restoration, and ventilation valve 6 is reset to its prior position. The repositioning of this valve resets temperature control valve 9, throttling down the amount of cooling liquid circulating in the temperature control circuit 2 and preventing further cooling of the individual. Thus, the system is restored to its preset or standby condition and prepared for a second cycle of control to counteract any subsequent change in the individual's temperature.

The cycle induced by a transient decrease of metabolic heat production is essentially the same except that the ventilation rate in the suit is decreased and either the amount of cooling liquid circulated through the temperature control circuit is decreased or a heating fluid is sent through this circuit. Thus, the system responds by warming space 8 to bring the individual's temperature up towards its normal level. This warming restores the individual's sweating rate back towards his normal level and corrects the humidity level within the enclosed space and at sensor 3 so that ventilation valve 6 and temperature control valve 9 return to their initial positions.

In both instances, an initial change in the individual sweating rate, reflecting either an incremental increase or decrease in his central temperature, is detected by the humidity sensor, and this sensor acts to maintain the humidity level of the environment constant and to force this central temperature back towards its normal value.

Instead of having a variable air flow system with the humidity sensor operating ventilation valve 6, a constant air flow system, such as that partially shown in FIG. 2, can be employed with this sensor directly coupled to the temperature control circuit through a suitable line 11. In this setup, control line 5 between sensor 3 and ventilating valve 6 and control line 10 between this valve and temperature control valve 9 are unnecessary and may be omitted. Ventilation valve 6 is set to a predetermined position so that air circulator 7 produces a constant air flow rate through space 8 and temperature control device 9 responds to signals sent to it from humidity sensor 3 to raise or lower the temperature in this space and hold the internal temperature of the individual at his set point.

Each arrangement, it will be appreciated, automatically unburdens the human system from the task of responding to internal or external temperature disturbances. Each restores and maintains the normalcy of body temperature and, in the case of increasing body temperatures, accomplishes this without increasing the individual's rate of sweating.

There are two artificial conditions which must be preselected in the systems, and either one may be adjusted at will. The first, which is the desired humidity level within the enclosure, should be set sufficiently below saturation to exclude any water condensation, which condensation could seriously upset the control when re-evaporation occurs.

The second parameter is the desired cranial internal temperature and sweating rate, both of which are linked through the physiologic control mechanism mentioned hereinbefore. Three typical temperatures may be 0.05° C., 0.1° C. and 0.2° C. above the individual's set point. The rates of evaporative heat loss and water loss from the skin for these $\Delta°$ C. are 5 cal./sec. and 37.5 g./hr. and 10 cal./sec. and 75 g./hr. and 20 cal./sec. and 150 g./hr. The first two of these settings require continuous operation of the liquid cooling circuit even with the individual at rest, while the third carries the metabolic heat at rest by sweat evaporation. During exercises, the third settings handles the additional load by resorting to the liquid cooling feature of the temperature control circuit.

However, with the third setting, there may be a conscious sensation of warmth and possibly some other unfavorable effects of moderate sweating as well as certain requirements for water supply.

In experiments carried on with the seven original astronauts, it was found that their set points were distributed over a range from 36.6° C. to 37.1° C. However, even with such a variation, the present invention automatically regulates itself to a given $\Delta°$ C. regardless of the position in absolute terms of the individual's particular set point.

The control system of FIG. 1 operates at a nearly constant level of humidity and, because of this, the humidity sensor functions only over a small fraction of its range. Consequently, problems of nonlinear response and changes of this response with excessive and long lasting loads of humidity are eliminated. Perhaps the main advantage of the control systems is that the unconscious sensory early warning of warm is intercepted and the burden of response is shifted from the human system to man-made devices. The cranial internal temperature is held to a predetermined level somewhat above, but not far above, the physiologic set point. Sweating at more than a predetermined low and constant intensity is prevented. Water losses and water requirements are minimized, and the humidity in the enclosed space is regulated and kept at a preselected desired level.

One of the consequences of utilizing the present invention is that the main flow of water for evaporative cooling does not pass through the human system by way of the sweat glands. There is, therefore, no significant loss of salts or danger of electrolyte imbalance. Organic compounds, such as fatty acids or lipids are not introduced into the enclosure as sources of bacterial putrefaction and infection. More importantly, perhaps, the main flow of water does not pass through the human blood circulation. Peripheral vasodilatation with the resulting strain on circulatory minute-volume and with requirements for circulatory adjustments or redistributions are avoided.

An additional benefit from employing the method of the present invention is that the water used for evaporative cooling is not contaminated and, thus, this water remains available for human consumption. A minor saving in oxygen consumption can also be realized for sweating raises metabolic demands by approximately 10% of basal requirements. Finally, without resorting to temperature sensors in or around the human body, the present invention in one form regulates internal body temperature and maintains it at an optimum level; regulates human water loss and minimizes it; and regulates the humidity of the environment and maintains it at a constant level.

It should be understood that the method of thermoregulating the temperature of an individual according to the present invention is not restricted or limited to the systems illustrated in FIG. 1 or 2 but can be used with advantage in any appropriate temperature control situation. Likewise, the control system can be utilized to regulate the temperature environment of space capsules or compartments where not one but a multiplicity of individuals are housed and isolated from the surrounding environment. Although the system of FIG. 1 employs the circulation of a heating or cooling fluid about the enclosure in order to regulate the temperature therein, other devices, such as electric heaters or thermal electric circuits, can be utilized, and all components can, if desired, be mounted within the enclosure.

Obviously many modifications and variations of the present invention are possible in the light of the above teachings. It is therefore to be understood that within the scope of the appended claims the invention may be practiced otherwise than as specifically described.

What is claimed is:

1. In an arrangement for maintaining the internal body temperature of an individual at a preselected level which is a finite $\Delta°$ C. above his normal "set point" temperature, the combination of an enclosure accommodating said individual and isolating him from the surrounding environment;

means for circulating a gaseous medium through said enclosure such that a portion thereof comes in contact with the skin area of said individual and effectively monitors his sweating rate;

a temperature control system for regulating the temperature within said enclosure;

a humidity sensor detecting the humidity level of said gaseous medium after it has circulated through said enclosure, said humidity sensor controlling the amount of said gaseous medium which is circulating through said enclosure so as to maintain the humidity level therein constant, said humidity sensor also controlling said temperature control system such that whenever the sweating rate of said individual changes in response to a departure of his internal body temperature from said preselected level said temperature control system either raises or lowers the temperature within said enclosure to restore the internal body temperature of said individual back to said preselected level.

2. In an arrangement as defined in claim 1 wherein said temperature control system initially establishes a temperature level within said enclosure such that the internal body temperature of said individual is set to said preselected level which is a finite $\Delta°$ C. above its normal "set point" temperature whereby incipient sweating of said individual occurs.

3. In an arrangement for maintaining the internal body temperature of an individual at a preselected level which is a finite $\Delta°$ C. above his normal "set point" temperature, the combination of an enclosure accommodating said individual and isolating him from the surrounding environment;

means for circulating a gaseous medium through said enclosure such that a portion thereof comes in contact with the skin area of said individual and effectively monitors his sweating rate;

a humidity sensor detecting the humidity level of said gaseous medium after it has been circulated through said enclosure;

a temperature control system for regulating the temperature level within said enclosure, said humidity sensor controlling the operation of said temperature control system such that as the sweating rate of said individual changes in response to a departure of his internal body temperature from said preselected level and said humidity sensor detects corresponding changes in the humidity level of the gaseous medium after it had circulated through said enclosure, said temperature control circuit either raises or lowers the temperature within said enclosure to restore the internal body temperature of said individual back to said preselected level.

4. In an arrangement for maintaining the internal body temperature of an individual at a preselected level which is a finite $\Delta°$ C. above his normal "set point" temperature, the combination of an enclosure accommodating said individual and isolating him from the surrounding environment;

means for circulating a gaseous medium through said enclosure such that a portion thereof comes in contact with the skin area of said individual and effectively monitors his sweating rate;

said last-mentioned means including a ventilating valve and a humidity sensor which detects the humidity level of said gaseous medium after it has been circulated through said enclosure and controls the setting of said valve and the amount of said gaseous medium circulating through said enclosure to maintain the humidity level within said enclosure constant;
a temperature control system for regulating the temperature level within said enclosure;
said humidity sensor also controlling said temperature control system such that as the sweating rate of said individual changes in response to corresponding change in his internal body temperature and departs from said preselected level, said temperature control system either raises or lowers the temperature level within said enclosure to restore the individual's internal body temperature back to said preselected level.

References Cited

UNITED STATES PATENTS

| | | | |
|---|---|---|---|
| 3,012,412 | 12/1961 | Muffly | 62—176 |
| 3,343,536 | 9/1967 | Brissom et al. | 128—142.5 |
| 3,280,636 | 10/1966 | Tomberg | 128—2 |
| 3,309,684 | 3/1967 | Kahn et al. | 340—279 |

WILLIAM E. KAMM, Primary Examiner

U.S. Cl. X.R.

165—21; 236—44